May 8, 1962
L. V. HAGGADONE
3,033,018
WHEEL FRICTION INDICATOR
Filed April 20, 1959
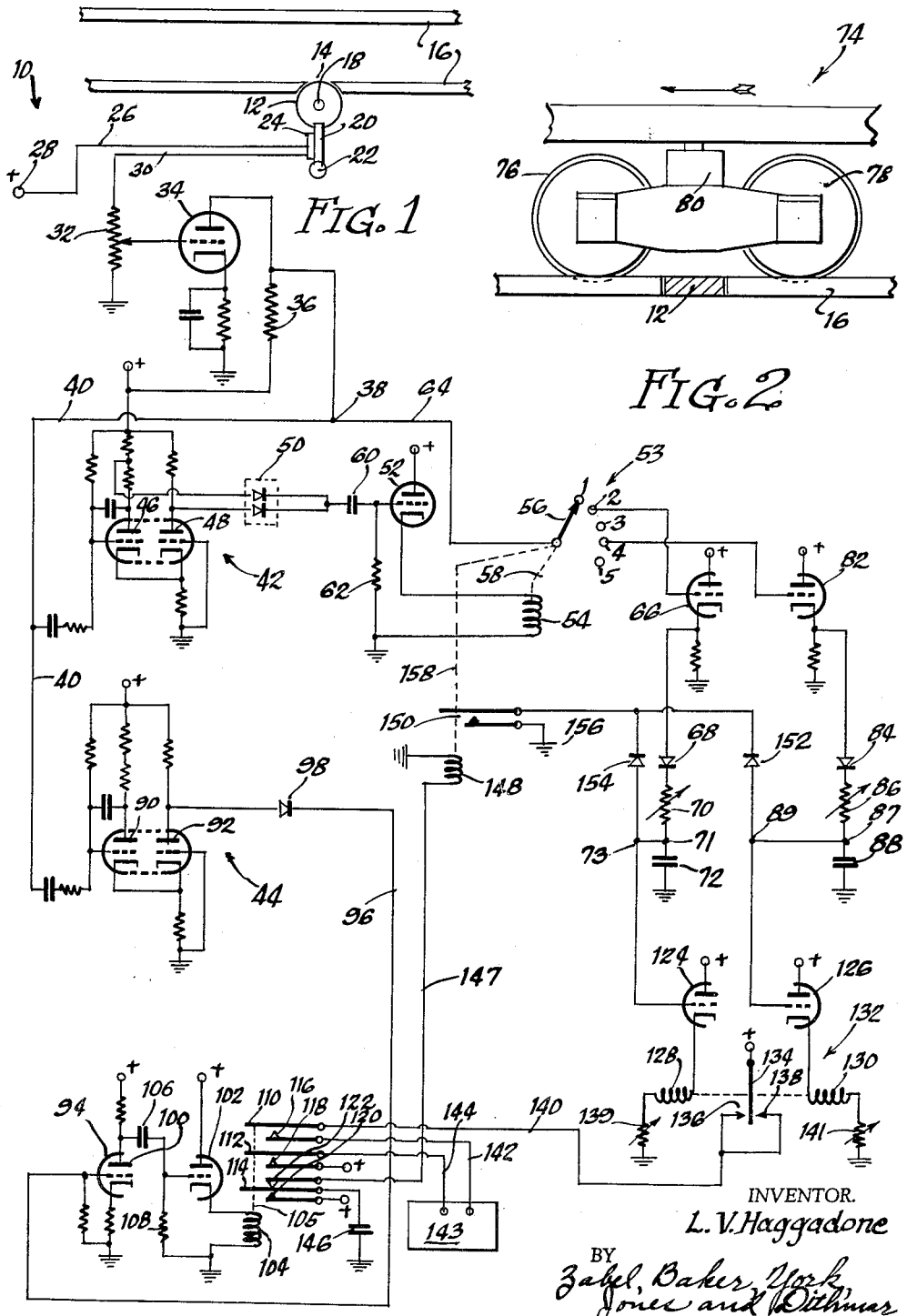
INVENTOR.
L. V. Haggadone
BY
Zabel, Baker, York,
Jones and Dithmar
Attorneys

3,033,018
WHEEL FRICTION INDICATOR

L. V. Haggadone, Indialantic, Melbourne, Fla., assignor, by direct and mesne assignments, to Free-Roll Tester Corporation, Chicago, Ill., a corporation of Illinois
Filed Apr. 20, 1959, Ser. No. 807,480
14 Claims. (Cl. 73—9)

This invention relates to an indicating device which compares the frictional characteristics of railway car wheels in each truck of a railway car in a train, in order to identify those trucks whose wheels have abnormal frictional characteristics, and is an improvement on the wheel friction indicator described in my United States Patent 2,837,911, dated June 10, 1958.

Railway cars are generally pivotally supported on trucks disposed at each end. Each truck may have two pairs of wheels and each pair of wheels is mounted on a common axle which is journalled at each end in a bearing or journal box. In the prior art as described in the above mentioned patent, a wheel friction sensing indicator is placed in a section of track, and if the condition of the wheel, axle, or journal box was abnormal or faulty, it would affect the coefficient of friction of the wheels resulting in increased frictional drag which could be detected by the instrument described in that patent.

The chief difficulty with the previous arrangement was that the magnitude of the fractional resistance of each pair of wheels was recorded on tape, and since trains may consist of a large number of railway cars, it was necessary to examine tape records which consisted of several hundred entries, in order to determine which wheel had abnormal characteristics. This was both time consuming and expensive. Furthermore, the varying load condition on the various railway cars and the effect of prior environmental factors may have a disturbing effect on the frictional drag of the wheels with the result that interpretation is difficult.

Since the load on each truck is distributed generally equally among its wheels, it has been found that if the condition of the wheels and axles are not abnormal, the magnitude of the frictional resistance or drag of each of the wheels on a common truck should not vary to any substantial extent.

The instrument described in the above mentioned patent was not well suited for comparing the magnitude of the frictional resistance of the wheels on the same truck because of the large number of entries in the tape record. In addition, if any of the cars on the trains had more than two pairs of wheels on each truck, e.g. three in order to carry very heavy loads, it would be almost impossible to interpret the tape record correctly.

An object of this invention is to provide a wheel friction indicating device which compares the frictional resistance of the railway car wheels on each truck and which responds only when the difference in frictional resistance between wheels mounted on a common truck exceeds a predetermined amount.

Another object of this invention is to provide a device which counts the number of trucks in a train, which compares the frictional resistance of the railway car wheels mounted on a common truck, and which responds by recording only the number of the truck when the difference in the magnitude of the frictional resistance of the wheels mounted on that truck exceeds a predetermined amount.

These and other objects, features and advantages of this invention will become more apparent when read in the light of the accompanying drawings and specifications wherein:

FIG. 1 is a circuit diagram of wheel friction comparator;

FIG. 2 is a side elevational view of a truck of a railway car on a track, in which an indicator is mounted.

Referring now to the drawing, the wheel friction comparator indicated generally by the reference numeral 10, comprises a displaceable metal contact block 12. This contact block is mounted in a gap 14 in one track of a pair of tracks 16, as shown in FIG. 1. The contact block 12 may have a cylindrical shape, although this shape is not critical. Block 12 is pivotally mounted by roller bearings (not shown) for rotation on a shaft 18, the axis of which may be vertical, as shown, or horizontal, and its thickness and radius are such that it substantially fills the gap 14 of the track.

With this arrangement, when a railway car passes over the contact block 12, any frictional wheel drag, which may be caused by a defect in the axle journal bearings, will cause the contact block 12 to rotate in the direction of movement of the car. The extent of angular displacement will be dependent on the magnitude of the frictional drag. This in turn is a function of the frictional characteristics of the car wheel. It will be understood that the term car wheel defects, includes defects in the axle or the journal bearings, for purposes of this invention.

A spring 20, in the form of a steel bar is provided to limit the rotation of the contact block 12. This spring is connected at one end to an anchor post 22 and at the other end to the contact block 12. As seen, the spring or steel bar 20 is positioned so it is substantially perpendicular to track 16. When a wheel of a railway car passes over the contact block 12, any rotation of the block will bend the steel bar or spring 20.

A strain gauge 24 is mounted on the steel bar 20 by any conventional means, and as the steel bar or spring 20 bends, the resistance of the strain gauge 24 will vary proportionately, in a manner well known in the art. As seen, a wire 26 leads one terminal of the strain gauge to a source 28 of electric power. Another wire 30 is connected to a terminal of a potentiometer 32, which in this particular embodiment, is connected to the grid circuit of a conventional sensor amplifier, built around the triode tube 34. It must be understood, however, that other amplifying circuits are possible, and are contemplated. In this connection it is also understood that means other than a strain gauge can be used to detect frictional drag in a wheel, e.g. a thermal sensitive indicator, or an indicator sensitive to radio-active tracer elements rubbed off of the rail by the wheel, or vice versa.

With the circuit shown in the drawing, however, when the spring bar 20 bends, the strain gauge 24 varies the bias on the grid of tube 34 and the magnitude of this variation is amplified by the tube 34 and appears as a voltage drop across the load resistor 36. Since one end of the load resistor is connected to terminal 38, the voltage on this terminal will be proportional to the signal output of the sensor amplifier.

Because the train is moving as the wheels of the railway cars pass over the contact block 12, the variation of the bias on the triode amplifying tube 34 will be of short duration. The bias on tube 34 may be adjusted so that the tube is substantially non-conducting until the bias is varied by the frictional drag of the railway car wheel passing over the contact block. With this arrangement, the output of tube 34 will be a signal in the form of a voltage impulse with a magnitude proportional to the frictional drag of the wheel, and a duration depending on the speed of the train.

As stated above, this voltage impulse appears on terminal 38 where the circuit divides into two branches. Wire 40 is one branch and is connected to the timers 42 and 44, which in this particular embodiment are conventional monostable multivibrators, but it is apparent that other timer circuits are possible and are contemplated. Timers 42 and 44 are substantially identical, but timer 44 is adjusted for a longer time cycle than timer 42 for purposes to become apparent below. The time cycle of these timers may be adjusted by varying the appropriate circuit elements in a manner well known in the art.

The connection between wire 40 and timers 42 and 44 is such that a voltage impulse at terminal 38 initiates operation of both timers. The operation of these timers causes in sequence a positive and negative voltage pulse to appear at each plate, as the timers move through their single cycle, i.e. from a non-operating state to an operating state, and back to a non-operating state, in a manner common to monostable multivibrators.

Plates 46 and 48 of timer 42 are connected through appropriate circuitry to the diode "OR" gate 50. This gate permits only the positive pulses from plates 46 and 48 to be applied to the grid of the cathode follower amplifier 52, and prevents the negative pulses, which occur as the timer 42 changes from an operating state to a non-operating state from affecting this amplifier.

The grid and the cathode of amplifier 52 are connected to the operating coil 54 of a step switch 53, and this coil, when energized by a voltage pulse from timer 42 causes the rotary contact 56 to rotate from one contact to the next adjacent position, by means of a conventional mechanical connection indicated schematically by the dotted line 58.

Initially, rotary contact 56 is connected to open position 1, but when timer 42 is operated, the first positive pulse from the plates causes coil 54 to be energized and this rotates the rotary contact to contact 2. When the timer 42 goes through an operating cycle, two successive pulses are applied to the grid of the cathode follower, and this causes operating coil 54 to be energized twice, so that rotary contact 56 is moved first to contact 2 and then to position 3. After this, timer 42 relapses back into its non-operating state. It is understood that the circuit could be modified so the rotary contact 56 requires only one pulse from a timer for effective operation.

It is important, however, for the operation of the rotary switch 56, shown in the drawing, that the operating coil 54, after being energized by one pulse from timer 42, be de-energized before the next pulse is applied to it, so that it may respond to this second pulse and advance rotary contact 56 to its next position. If the operating coil 54 were not so de-energized by the time the next pulse was supplied by the timer 42, the pulse might have no effect on the rotary contact 56. To regulate the period of energization of coil 54, the RC circuit, including condenser 60 and resistance 62 is connected to the coil, and the values of these circuit elements are selected so that the time period for energization of coil 54 is shorter than the time period of the operating timer 42.

To this point, it can be seen that frictional wheel drag applied to contact block 12 appears as an amplified voltage impulse signal at terminal 38, and this initiates the operation of timers 42 and 44, and causes the rotary contact 56 to advance from position 1 to contact 2 and on to position 3. At the same time, branch wire 64 is connected between terminal 38 and the rotary contact 56, so that any voltage impulse appearing on terminal 38 will also appear on the rotary contact 56.

Contact 2 is connected to the grid of a cathode follower connected tube 66. The cathode of this tube is connected to one terminal of the grounded storage capacitor 72.

With this arrangement, when a voltage impulse proportional to the magnitude of the frictional resistance of a wheel appears at terminal 38, part of this signal causes timers 42 and 44 to operate and move through their single cycle, and this as described above causes rotary contact 56 to move from open position 1 to contact 2 and on to open position 3. When the rotary contact 56 is connected to contact 2, the voltage impulse on terminal 38 is connected to the grid of the cathode follower connected tube 66 so that a voltage signal proportional to the frictional resistance of the wheel is supplied to and stored in the storage capacitor 72. It is apparent that the cathode follower connected tube or storage circuit 66 serves to isolate the storage capacitor 72 from the sensor amplifier 34, and the diode 68 prevents the charged storage capacitor 72 from discharging through resistance 70 to the cathode of tube 66 and ultimately to ground.

As stated above, most railway cars are pivotally supported on trucks which are disposed at each end, and as seen in FIG. 2, each truck 74 usually consists of two pairs of wheels 76 and 78, mounted on axles which are rotatably supported in journal boxes (not shown), on the truck frame 80, in a manner well known in the art. If a train is moving in the direction indicated by the arrow in FIG. 2, then wheel 76 will first roll over the metal contact block 12, and any frictional resistance or drag in the wheel 76 will produce a signal which when amplified by the sensor amplifier 34 will ultimately be stored in the storage capacitor 72.

By the time wheel 78 in truck 74 passes over the contact block 12, the rotary contact switch 56 has been advanced to position 3 and the storage capacitor 72 has or is being charged to a voltage whose magnitude is proportional to the frictional resistance of wheel 76. In addition, timer 42 has reverted back to its non-operated state. It is noted, however, that because timer 44 has been adjusted for a longer time interval, it will still be in an operated state. This means that the railway train cannot be moving too slowly as it passes over contact block 12, otherwise timer 44 will also have reverted to its non-operated state. In fact, it is important that the train be moving at a predetermined speed as it passes over the contact block 12, both to eliminate possible frictional variations caused by different train speeds, and to permit the various circuit constants to be adjusted properly. Consequently, as wheel 78 passes over contact block 12, its frictional drag will also appear as an amplified voltage impulse at terminal 38. This voltage impulse through wire 40 will again cause timer 42 to operate through a single cycle, as it did when wheel 76 ran over the contact block 12, but because timer 44 is still in its operating state, the voltage impulse due to wheel 78 will have no effect on it.

As in the manner described in connection with wheel 76, the voltage pulses from timer 42 triggered by the signal produced by the frictional resistance of wheel 78 will cause rotary contact 56 to advance from position 3 to contact 4 and on to position 5. When the rotary contact 56 is in contact with position 4, the voltage impulse at terminal 38, which as described above is proportional to the frictional resistance of wheel 78, is applied to the grid of the cathode follower connected tube or storage circuit 82. The cathode of tube 82 is connected to one terminal of a diode 84. The other terminal of this gate is connected to one terminal of a variable resistance 86 for adjusting the time constant of the storage circuit 82, for reasons to be described below. The opposite terminal 87 of resistance 86 is connected to one terminal of the grounded storage capacitor 88.

With this arrangement, when a voltage impulse proportional to the frictional resistance or drag of wheel 78 appears at terminal 38, a voltage proportional to this frictional resistance will be stored in the storage capacitor 88. As described above in connection with storage capacitor 72, the cathode follower 82 serves to isolate the storage capacitor 88 from sensor amplifier 34, and the diode 84 prevents the charged storage capacitor 88 from discharging through resistance 86 to the cathode of the tube 82 and ultimately to ground.

After wheel 78, moving with the train at a predetermined speed has passed over contact block 12, timer 42, and then timer 44 which is adjusted in contemplation of the speed of the train, return to their non-operated or quiescent state. Although both positive and negative pulses appear at plates 90 and 92 of timer 44, only plate 92 is connected to the grid of the amplifier tube 94 by a wire 96. Since the diode 98 is connected in wire 96, only a single positive pulse will appear on the grid of amplifier 94 each time timer 44 moves from its non-operated state to its operated state and back again. Because timer 44 goes through its cycle only once, each time a truck 74 passes over contact block 12, the number of pulses supplied by the timer 44 will be exactly equal to the number of trucks in the train.

The plate 100 of amplifier tube 94 is connected to the grid of the cathode follower connected tube 102. The cathode of tube 102 is connected to relay coil 104 so that a signal from amplifier tube 94 on the grid of the cathode follower connected tube 102 energizes relay coil 104 for a period depending on the RC circuit comprising capacitor 106 and resistance 108.

When relay 104 is energized, it causes movable contacts 110, 112, and 114, which are mechanically connected to the relay coil 104, as indicated by the dotted line 105 to move and engage fixed contacts 116, 118, and 120, for a period of energization of relay coil 104. It is noted that movable contact 114 is initially in engagement with a fixed contact 122 and moves away from this contact into engagement with contact 120 when the relay coil 104 is energized, but when relay coil 104 is de-energized, movable contact 114 will move back into engagement with fixed contact 122, for reasons to be described below.

The voltage in storage capacitor 72 is applied through terminals 71 and 73 to the grid of the cathode follower connected tube 124, and the voltage from storage capacitor 88 is applied through terminals 87 and 89 to the grid of the cathode follower connected tube 126. These tubes supply power to coils 128 and 130, in polar relay 132, in proportion to the voltage on their grids. As seen, coils 128 and 130 are positioned in opposition to the movable contact 134, and if the voltage stored in capacitors 72 and 88 differ from each other by more than a predetermined amount (the precise value to be determined by experience), the power supplied to coils 128 and 130 which is proportional to the voltage in the storage capacitors 72 and 88, will cause the movable contact 134 to engage either of the fixed contacts 136 or 138, depending on which coil is supplied with the most power. Resistances 139 and 141 in the polar relay 131 can be adjusted to permit the polar relay 132 to respond to any desired voltage difference.

Since storage capacitor 72 is charged first by wheel 76, coil 128 may first draw the movable contact 134 into engagement with contact 136. Then when storage capacitor 88 becomes charged, the coil 130 may draw the movable contact 134 away from its engagement with contact 136. This initial engagement between the movable contact 134 and the fixed contact 136 will not cause any difficulty, since the contact 134 is connected in series with contacts 110 and 116, and, as described above, relay coil 104 will not be energized until after wheel 78 has rolled over contact block 12. However, it may be desirable to prevent this initial engagement in order to eliminate excessive wear on the movable contact 134 and the fixed contact 136. The reason is that with the above described arrangement, the movable contact 134 would engage fixed contact 136 each time a truck of a railway car passed over the contact block 12, and for trains consisting of a large number of cars, this could mean hundreds of such engagements for each train. This initial engagement between movable contact 134 and fixed contact 136 can be prevented, if desired, by employing conventional circuit elements in a conventional way so that the voltage on capacitors 72 and 88 are applied to coils 128 and 130 simultaneously, thereby causing coils 128 and 130 to be energized at the same time. With this arrangement, movable contact 134 would engage one of the fixed contacts in the polar relay, only when the voltage difference between storage capacitors 72 and 88 exceeds a predetermined amount.

As seen, one terminal of the movable contact 134 is connected to a voltage source, and both terminals 136 and 138 are connected to common wire 140. Wire 140 is connected to movable contact 110, and when relay 104 is closed, movable contact 110 will engage fixed contact 116 and supply a print impulse to wire 142 leading to the print section of the conventional electro-mechanical "Print on Demand" impulse counter recorder 143. In addition, each time relay 104 is energized, movable contact 112 moves into engagement with fixed contact 118, supplying a voltage impulse to wire 144 leading to the counter advance section of the counter recorder 143.

In operation to this point, relay 104 closes each time a truck of the railway car passes over contact block 12, and this causes the type on a number wheel in the counter recorder 143 to advance so that type having the next succeeding number moves into printing position. It is important to note that this number is not printed on tape unless a voltage impulse is supplied to recorder 143 through wire 142, and this will only happen when there is a voltage difference between storage capacitor 72 and 88 sufficient to actuate polar relay 132. Consequently the only numbers which appear on the tape will be the numbers of the trucks in the train which are defective in some respect. This greatly simplifies and expedites the problem of locating defective wheels in long trains, and the accuracy of detection is increased because only the wheels on the same trucks are compared with each other. This eliminates possible errors caused by frictional variations in the wheel due to different loads.

A reset mechanism is necessary to set automatically the above described apparatus for the next truck in the train. This mechanism operates as follows. When relay 104 closes movable contact 114 moves into engagement with fixed contact 120, and since movable contact 114 is connected to capacitor 146 and fixed contact 120 is connected to a voltage source, capacitor 146 will then be charged. Then when relay 104 is de-energized due to the effect of condenser 106, and resistance 108, movable contact 114 will move back into engagement with fixed contact 122.

As seen, contact 122 is connected to relay coil 148 through wire 147, and when movable contact 114 moves back into engagement with fixed contact 122, capacitor 146 will discharge through relay coil 148, momentarily energizing it. When relay 148 is energized, two things happen. First of all, contacts 150 close. This permits storage capacitors 72 and 88 to discharge through gates 152 and 154 and on through the temporarily closed contacts 150 to ground 156, so that these storage capacitors may subsequently be recharged by the frictional characteristics of the wheels on the next truck in the train. At the same time, relay coil 148 through a conventional mechanical connection symbolized by a dotted line 158 resets the step switch 53 by returning rotary contact 56 back to the initial "1" position, so that the entire apparatus is now set to respond to the next truck.

Although the device is described as a means for comparing the frictional characteristics of wheels on railway cars, the principles of this invention can be applied for comparing other physical characteristics of the wheels or of any other part of the railway cars.

Although only a preferred embodiment of my invention has been shown and described herein, it will be understood that various modifications and changes can be made in the construction shown without departing from the spirit of my invention as pointed out in the appended claims.

I claim:

1. A device for comparing with each other a particular characteristic of the wheels on each truck of a railway car in a train and adapted for association with a pulse responsive indicating device comprising means for detecting the particular characteristic of the wheels as they pass over a predetermined portion of railway track, said detecting means providing a signal proportional to the magnitude of the particular characteristic it detects, a first signal responsive means for connection to said detecting means only when the first wheel on a truck of a railway car passes over the said predetermined portion of the track to respond for producing an output in proportion to the magnitude of the first signal provided by said detecting means, a second signal responsive means for connection to said detecting means only when the second wheel on a truck of a railway car passes over the said predetermined portion of the track to respond for producing an output in proportion to the magnitude of the second signal provided by said detecting means, means for connecting said first signal responsive means to said detecting means when said first wheel passes over said predetermined portion and for connecting said second signal responsive means to said detecting means when said second wheel passes over said predetermined portion, and pulse producing actuating means responsive to the outputs from said first and second signal responsive means to compare said outputs, to operate only when the difference in response between said first and second signal responsive means exceeds a predetermined amount, said actuating means being connected to said pulse responsive indicating device to actuate same only when the difference in physical characteristic between said first and second wheels on a truck exceeds a predetermined amount, whereby only those trucks whose wheels have a particular characteristic which differs from each other by a predetermined amount will be indicated.

2. A device according to claim 1, including reset means connected to respond to said detecting means during the passage of each truck over said predetermined portion of track and connected to said first and second signal responsive means for removing the outputs thereof caused by the wheels of a truck of a railway car after each truck has passed by said predetermined portion of said railway track, whereby the device is set to respond to the particular characteristic of the wheels on the next truck in the train.

3. A device for comparing with each other a particular characteristic of the wheels on each truck of a railway car in a train and adapted for association with a pulse responsive indicating device comprising in combination means for detecting the particular characteristic of the wheels, said detecting means being positioned in effective relationship to a predetermined portion of the track over which the wheels pass and providing a signal proportional to the magnitude of the said particular characteristic it detects, switching means connected to said detecting means and having first and second switching positions, means moving said switching means at least between said two positions to successively connect said detecting means thereto, a first signal responsive means connected with the first switching position of said switching means and a second signal responsive means connected with the second switching position of said switching means whereby when said switching means is in said first switching position a first signal provided by said detecting means causes only said first signal responsive means to respond and produce an output in proportion to the magnitude of the said first signal, and when said switching means is in said second switching position a second signal provided by said detecting means causes only said second signal responsive means to respond and produce an output in proportion to the magnitude of the said second signal, pulse producing actuating means responsive to the outputs from said first and second signal responsive means to compare said outputs, to operate only when the difference in response between said first and second signal responsive means exceeds a predetermined amount, and a control circuit connected to said switching means to cause it to be in its first switching position when the first wheel of a railway car truck passes over the said predetermined portion of a track and to be in a second switching position when the second wheel of a railway car truck passes over the said predetermined portion of the track, said actuating means being connected to said pulse responsive indicating device to actuate same only when the difference in physical characteristics between said first and second wheels on a truck exceeds a predetermined amount, whereby only those trucks whose wheels have a particular characteristic which differs from each other by a predetermined amount will be indicated.

4. A device according to claim 3 including reset means connected to respond to said detecting means during the passage of each truck over said predetermined portion of track and connected to said first and second signal responsive means for removing the outputs thereof caused by the wheels of a truck of a railway car after each truck has passed by said predetermined portion of said railway track, whereby the device is set to respond to the particular characteristic of the wheels on the next truck in the train.

5. A device for comparing with each other the frictional characteristics of the wheels on each truck of a railway car in a train and adapted for association with a pulse responsive indicating device comprising in combination means for detecting the frictional characteristics of the wheels, said detecting means being positioned in effective relationship to a predetermined portion of the track over which the wheels pass and providing a signal proportional to the magnitude of the frictional characteristics of each wheel, a first storage capacitor for connection to said detecting means only when the first wheel on a truck of a railway car passes over the said predetermined portion of the track and charged thereby to a voltage whose magnitude is proportional to the magnitude of the first signal provided by said detecting means, a second storage capacitor for connection to said detecting means only when the second wheel of the truck of the railway car passes over the said predetermined portion of the track and charged thereby to a voltage whose magnitude is proportional to the magnitude of the second signal provided by said detecting means, means for connecting said first storage capacitor to said detecting means when said first wheel passes over said predetermined portion and for connecting said second storage capacitor to said detecting means when said second wheel passes over said predetermined portion, and a pulse producing polar relay connected to said first and second storage capacitors and operating only when the difference in the voltage stored in said first and second storage capacitors exceeds a predetermined amount, said polar relay being connected to said pulse responsive indicating device to actuate same only when the difference in frictional characteristics between said first and second wheels on a truck exceeds a predetermined amount, whereby only those trucks whose wheels have a frictional characteristic which differs from each other by a predetermined amount will be indicated.

6. A device according to claim 5 including reset means connected to respond to said detecting means during the passage of each truck over said predetermined portion of track and having means connected to said first and second storage capacitors for discharging the voltages thereon after each truck of a railway car passes over said predetermined portion of the railway track so that the device will compare the frictional characteristics of the wheels on the next truck in the train.

7. A device for comparing with each other the frictional characteristics of the wheels on each truck of a railway car in a train and adapted for association with a counter recorder having pulse responsive counter mechanism and pulse responsive recording mechanism comprising in combination means for detecting the frictional characteristics of the wheels, said detecting means being positioned in effective relationship to a predetermined portion of the track over which the wheels pass and providing a signal proportional to the magnitude of the frictional characteristics of each wheel, a rotary contact connected to said detecting means and movable between at least two contacts, a first storage capacitor connected to a first contact and a second storage capacitor connected to a second contact whereby when said rotary contact engages said first contact a first signal provided by said detecting means will charge said first storage capacitor with a voltage whose magnitude is proportional to the magnitude of the said first signal, and when said rotary contact engages said second contact a second signal provided by said detecting means will charge said second storage capacitor with a voltage whose magnitude is proportional to the magnitude of the second signal, a pulse producing polar relay connected to said first and second storage capacitors and operating only when the difference in the voltage stored in said first and second storage capacitors exceeds a predetermined amount, and first and second timers connected to said detecting means and actuated thereby, means drivingly connecting said first timer with said rotary contact for causing said rotary contact to engage said first contact when the first wheel of the truck of a railway car passes over said predetermined portion of the track and for causing said rotary contact to rotate and engage said second contact when the second wheel of the truck of a railway car passes over the said predetermined portion of the track, said second timer being connected to said counting mechanism and producing a pulse to advance the same one digit each time a truck of a railway car passes over said predetermined portion of the railway track, said polar relay being connected to said pulse responsive recording mechanism to actuate same only when the difference in frictional characteristics between said first and second wheels on a truck exceeds a predetermined amount, whereby only those trucks whose wheels have frictional characteristics which differ from each other by a predetermined amount will be indicated.

8. The device set forth in claim 7 wherein said first and second timers are monostable multivibrators.

9. The device set forth in claim 7 including a reset mechanism connected to respond to said detecting means during the passage of each truck over said predetermined portion of track and having means connected both for discharging the voltage stored in said first and second storage capacitors after each truck of a railway car has passed over said predetermined portion of the railway track, and for repositioning said rotary contact so that the device can compare the frictional characteristic of the wheels on the next truck in a train.

10. A device for comparing with each other a particular characteristic of wheels on each truck of a railway car in a train comprising in combination means for detecting the particular characteristic of the wheels as they pass over a predetermined portion of the railway track, said detecting means providing a signal proportional to the magnitude of the particular characteristic it detects, a first signal responsive means for connection to said detecting means only when the first wheel on a truck of a railway car passes over the said predetermined portion of the track to respond for producing an output in proportion to the magnitude of the first signal provided by said detecting means, a second signal responsive means for connection to said detecting means only when the second wheel on a truck of a railway car passes over the said predetermined portion of the track to respond for producing an output in proportion to the magnitude of the second signal provided by said detecting means, means for connecting said first signal responsive means to said detecting means when said first wheel passes over said predetermined portion and for connecting said second signal responsive means to said detecting means when said second wheel passes over said predetermined portion, actuating means responsive to the outputs from said first and second signal responsive means to compare said outputs, to operate only when the difference in response between said first and second signal responsive means exceeds a predetermined amount, and a counter recorder, means connected to said counter recorder to give it a count impulse at least when the second car wheel of each railway car truck passes over the said predetermined portion of the track, said actuating means being connected to said counter recorder to operate its recording mechanism, whereby only the numbers of those trucks whose wheels have a particular characteristic which differs from each other by a predetermined amount are recorded.

11. The device set forth in claim 10 including reset means connected to respond to said detecting means during the passage of each truck over said predetermined portion of track and connected to said first and second signal responsive means for removing the outputs thereof caused by the wheels of a truck of a railway car after each truck has passed by the said predetermined portion of the railway track whereby the device is set to respond to the particular characteristic of the wheels on the next truck in the train.

12. A device for comparing with each other the frictional characteristics of the wheels on the truck of a railway car in a train comprising means for detecting the frictional characteristics of the wheels, said means being positioned in effective relationship to a predetermined portion of the track the wheels pass over and providing a signal proportional to the magnitude of the frictional characteristics of each wheel, a rotary contact connected to said detecting means and movable between at least two contacts, a first storage capacitor connected to a first contact and a second storage capacitor connected to a second contact whereby when said rotary contact engages said first contact a first signal provided by said detecting means will charge said first storage capacitor with a voltage whose magnitude is proportional to the magnitude of the said first signal, and when said rotary contact engages said second contact a second signal provided by said detecting means will charge said second storage capacitor with a voltage whose magnitude is proportional to the magnitude of the second signal, a polar relay connected to said first and second storage capacitors and operating only when the difference in the voltage stored in said first and second storage capacitors exceeds a predetermined amount, first and second timers connected to said detecting means and actuated thereby, means drivingly connecting said first timer with said rotary contact for causing said rotary contact to engage said first contact when the first wheel of the truck of a railway car passes over said predetermined portion of the track, and for causing said rotary contact to rotate and engage said second contact when the second wheel of the truck of a railway car passes over the said predetermined position, and a counter recorder, said second timer being connected to said counter recorder to advance the counting mechanism thereof each time a truck of a railway car passes over the said predetermined portion of the railway track, said polar relay being connected to and operating the recording mechanism of said counter recorder, whereby only the number of the truck whose wheels have frictional characteristics which differ from each other by more than a predetermined amount would be recorded by the counter recorder.

13. The apparatus set forth in claim 12 wherein said first and second timers are monostable multivibrators.

14. The apparatus set forth in claim 12 including reset mechanism connected to respond to said detecting means during the passage of each truck over said predetermined portion of track and having means connected both for discharging the voltage stored in said first and second storage capacitors after each truck of a railway car has passed over said predetermined portion of the railway track and for repositioning said rotary contact so that the device can compare the frictional characteristic of the wheels on the next truck in the train.

References Cited in the file of this patent
UNITED STATES PATENTS 2,837,911  Haggadone _____ June 10, 1958